US008954458B2

(12) United States Patent
Chandrasekharappa et al.

(10) Patent No.: US 8,954,458 B2
(45) Date of Patent: Feb. 10, 2015

(54) SYSTEMS AND METHODS FOR PROVIDING A CONTENT ITEM DATABASE AND IDENTIFYING CONTENT ITEMS

(75) Inventors: Santhosh Baramasagara Chandrasekharappa, Bangalore (IN); Sivakumar Ekambaram, Bangalore (IN); Saurabh Sohoney, Bangalore (IN); Rakesh Nigam, Chennai (IN)

(73) Assignee: AOL Inc., Dulles, VA (US)

( * ) Notice: Subject to any disclaimer, the term of this patent is extended or adjusted under 35 U.S.C. 154(b) by 0 days.

(21) Appl. No.: 13/179,940

(22) Filed: Jul. 11, 2011

(65) Prior Publication Data

US 2013/0018884 A1 Jan. 17, 2013

(51) Int. Cl.
  *G06F 7/00* (2006.01)
  *G06F 17/30* (2006.01)
(52) U.S. Cl.
  CPC .............................. *G06F 17/30985* (2013.01)
  USPC ......................... 707/758; 707/755; 707/769
(58) Field of Classification Search
  CPC ................................................ G06F 17/30985
  USPC ........................................ 707/755, 758, 769
  See application file for complete search history.

(56) References Cited

U.S. PATENT DOCUMENTS

| | | | |
|---|---|---|---|
| 5,577,249 A | | 11/1996 | Califano |
| 6,349,296 B1 | | 2/2002 | Broder et al. |
| 6,578,032 B1 | | 6/2003 | Chandrasekar et al. |
| 6,779,021 B1 | * | 8/2004 | Bates et al. ................... 709/206 |
| 7,089,241 B1 | * | 8/2006 | Alspector et al. ..................... 1/1 |
| 7,392,262 B1 | * | 6/2008 | Alspector et al. ..................... 1/1 |
| 7,523,168 B2 | | 4/2009 | Chadwick et al. |
| 7,552,112 B2 | | 6/2009 | Jhala et al. |
| 7,562,304 B2 | * | 7/2009 | Dixon et al. ................... 715/738 |
| 7,617,285 B1 | | 11/2009 | Hartmann |
| 7,624,274 B1 | * | 11/2009 | Alspector et al. ............. 713/176 |
| 7,644,076 B1 | | 1/2010 | Ramesh et al. |
| 7,644,127 B2 | | 1/2010 | Yu |

(Continued)

OTHER PUBLICATIONS

International Search Report dated Nov. 5, 2012, issued for PCT/US2012/045399 filed Jul. 3, 2012 (5 pages).

(Continued)

*Primary Examiner* — Cheyne D Ly
(74) *Attorney, Agent, or Firm* — Finnegan, Henderson, Farabow, Garrett & Dunner, LLP

(57) ABSTRACT

Systems and methods are provided for identifying unsolicited or unwanted electronic communications, such as spam. The disclosed embodiments also encompass systems and methods for selecting content items from a content item database. Consistent with certain embodiments, computer-implemented systems and methods may use a clustering based statistical content matching anti-spam algorithm to identify and filter spam. Such a anti-spam algorithm may be implemented to determine a degree of similarity between an incoming e-mail with a collection of one or more spam e-mails stored in a database. If the degree of similarity exceeds a predetermined threshold, the incoming e-mail may be classified as spam. Further, in accordance with other embodiments, systems and methods may be provided to determine a degree of similarity between a query or search string from a user and content items stored in a database. If the degree of similarity exceeds a predetermined threshold, the content item from the database may be identified as a content item that matches the query or search string provided by the user.

16 Claims, 9 Drawing Sheets

(56) References Cited

U.S. PATENT DOCUMENTS

| | | |
|---|---|---|
| 7,930,351 B2 | 4/2011 | Daniell et al. |
| 8,015,162 B2 | 9/2011 | Henzinger |
| 2003/0158850 A1* | 8/2003 | Lawrence et al. ............. 707/100 |
| 2004/0117648 A1 | 6/2004 | Kissel |
| 2005/0091321 A1 | 4/2005 | Daniell et al. |
| 2005/0108340 A1 | 5/2005 | Gleeson et al. |
| 2005/0120019 A1 | 6/2005 | Rigoutsos et al. |
| 2005/0132197 A1 | 6/2005 | Medlar |
| 2006/0075048 A1 | 4/2006 | Gruper et al. |
| 2006/0149820 A1 | 7/2006 | Rajan et al. |
| 2006/0149821 A1 | 7/2006 | Rajan et al. |
| 2006/0259558 A1 | 11/2006 | Yen |
| 2007/0061402 A1 | 3/2007 | Mehr et al. |
| 2007/0156732 A1 | 7/2007 | Surendran et al. |
| 2007/0156886 A1 | 7/2007 | Srivastava |
| 2008/0104062 A1 | 5/2008 | Oliver et al. |
| 2008/0140653 A1* | 6/2008 | Matzke et al. .................... 707/6 |
| 2008/0201411 A1 | 8/2008 | Paritosh |
| 2009/0222917 A1 | 9/2009 | Mills et al. |
| 2010/0145900 A1 | 6/2010 | Zheng et al. |
| 2012/0239650 A1 | 9/2012 | Kim et al. |

OTHER PUBLICATIONS

Written Opinion of the International Searching Authority dated Nov. 5, 2012, issued for PCT/US2012/045399 filed Jul. 3, 2012 (7 pages).
Office Action dated Jul. 24, 2012 in U.S. Appl. No. 13/179,863, 14 pages.
Office Action dated Dec. 6, 2012 in U.S. Appl. No. 13/179,863, 16 pages.
U.S. Patent Application of Rakesh Nigam et al. entitled "Systems and Methods for Providing a Spam Database and Identifying Spam Communications" filed on Jul. 11, 2011, U.S. Appl. No. 13/179,863, 52 pages.
Notification of transmittal of the international search report and the written opinion of the international searching authority, or the declaration in International application No. PCT/US2012/045514, 1 page.
International Search Report in International application No. PCT/US2012/045514, 3 pages.
Written Opinion of the International Searching Authority in International application No. PCT/US2012/045514, 8 pages.
A. K. Jain et al., "Data Clustering: A Review," ACM Computing Surveys, vol. 31, No. 3, pp. 264-323, 1999, 60 pages.

* cited by examiner

SYSTEMS AND METHODS FOR PROVIDING A CONTENT ITEM DATABASE AND IDENTIFYING CONTENT ITEMS

TECHNICAL FIELD

The present disclosure relates generally to the field of electronic communications, and systems and methods for providing a content item database and identifying or classifying content items. More particularly, and without limitation, the present disclosure relates to systems and methods for identifying spam communications, or searching for desired content using statistical algorithms.

BACKGROUND

Electronic communications including, for example, electronic mail (e-mail), instant messaging, chat, text messaging, short message service (SMS), pager communications, blog posts, news items etc., pervade all aspects of our lives. The explosive growth of electronic content items has created an acute need for methods that allow users to quickly identify content items related to a topic of their choosing. The widespread use of electronic communications has also spurred its misuse. For example, users of electronic communications continue to receive a barrage of unsolicited or unwanted communication. Such electronic communication, termed spam, includes unsolicited, unwanted, or duplicative communication, or electronic junk mail, which is usually sent in large quantities indiscriminately to a large number of recipients. Spam may contain unwanted advertising, solicitation, inappropriate content, malicious content, abusive content etc.

A spammer, responsible for sending spam communications, has little to no operating costs other than those required to manage mailing lists. As a result, the volume of spam has increased exponentially. Most spam consists of harmless advertising, although, recently spammers have used spam for malicious purposes like collecting a user's personal information and spreading computer viruses. Regardless of its use, spam is annoying to users because of its undesirable content and sheer volume.

Over the years, techniques have been proposed to identify and filter spam communications. Most of these proposed techniques rely on algorithms based on machine learning, for example, naive bayes, and logistic regression. These techniques, however, suffer from significant drawbacks. For example, these techniques are slow and take too much time to determine whether an incoming electronic communication is spam. In addition, they may result in a high false positive rate by erroneously classifying good electronic communications as spam.

In view of the above drawbacks, there is a need for improved systems and methods for identifying spam communications. There is also a need for improved systems and methods for identifying spam communications that are more efficient and less prone to provide erroneous classifications or high false positive rates. In addition, there is need for improved methods of identifying content items corresponding to a user query.

SUMMARY

In accordance with the present disclosure, systems and methods are provided for identifying unsolicited or unwanted electronic communications, such as spam. Embodiments of the present disclosure also encompass systems and methods for identifying spam communications using statistical algorithms. In addition, embodiments of the present disclosure encompass systems and methods for searching for content items in a content item database using statistical algorithms.

In accordance with certain embodiments, a clustering based statistical content matching anti-spam algorithm is provided. As disclosed herein, embodiments of the algorithm may provide an easy signature that captures the overlap, or degree of similarity, between two e-mails treated as strings over a particular alphabet. Embodiments of the algorithm can provide a fast and robust solution against various spam activities, such as the use of misspelled words, word permutations, and deletions and insertions of chunks of text. Moreover, embodiments of the clustering based statistical content matching anti-spam algorithm may be implemented to provide a low false positive rate compared to previous spam identification techniques.

In accordance with one exemplary embodiment, a computer-implemented method is provided for identifying an incoming e-mail or other electronic communication as spam. By way of example, the method comprises accessing the incoming e-mail from a memory device; creating a first set of tokens from the incoming e-mail; accessing a second set of tokens from the memory device, wherein the second set of tokens corresponds to an e-mail stored in a spam database; determining a degree of similarity between the first set of tokens and the second set of tokens; and identifying the incoming e-mail as spam if the degree of similarity exceeds a predetermined threshold.

In accordance with another exemplary embodiment, a computer-implemented method is provided for identifying a content item from a content item database. By way of example, the method comprises accessing a user's query or search string from a memory device, creating a first set of tokens from the user's query or search string, and accessing a second set of tokens from the memory device, wherein the second set of tokens corresponds to a content item stored in the content item database. The method may also include determining a degree of similarity between the first set of tokens and the second set of tokens, and selecting a content item from the content item database if the degree of similarity exceeds a predetermined threshold.

In accordance with another exemplary embodiment, a computer-implemented system is provided for identifying an incoming e-mail or other electronic communication as spam. By way of example, the system includes a database which stores a plurality of spam e-mails; a server which performs offline processing; and a client which performs online processing. The offline process of the server includes accessing a spam e-mail from the database; creating a first set of tokens from the spam e-mail; calculating a first total as a number of tokens in first set of tokens; and storing the first set of tokens and the first total. The online process of the client includes receiving the incoming e-mail; creating a second set of tokens from the incoming e-mail; calculating a second total as a number of tokens in second set of tokens; accessing the first set of tokens and the first total corresponding to a selected one of the plurality of spam e-mails; determining a number of common tokens which are present in both the first set of tokens and the second set of tokens; computing an easy signature as a ratio of the number of common tokens and the sum of the first total and the second total; and designating the incoming e-mail as spam when the easy signature exceeds a predetermined threshold.

In accordance with another exemplary embodiment, a computer-implemented system of selecting a content item from a content item database is provided. By way of example, the system includes a content item database which stores a plurality of spam e-mails; a server which performs offline processing; and a client which performs online processing. The offline process of the server includes accessing a content time from the content item database; creating a first set of tokens from the content item; calculating a first total as a number of tokens in first set of tokens; and storing the first set of tokens and the first total. The online process of the client includes receiving an incoming query; creating a second set of tokens from the incoming query; calculating a second total as a number of tokens in the second set of tokens; accessing the first set of tokens and the first total corresponding to one of the plurality of content items in the content item database; determining a number of common tokens which are present in both the first set of tokens and the second set of tokens; computing an easy signature as a ratio of the number of common tokens and the sum of the first total and the second total; and designating the content item in the content item database as matching the incoming query when the easy signature exceeds a predetermined threshold.

In accordance with another exemplary embodiment, a computer program product is provided. By way of example, the computer program product includes executable instructions tangibly embodied in a non-transitory computer-readable medium for performing a method of identifying an incoming e-mail or other electronic communication as spam. The method may include accessing the incoming e-mail from a memory device; creating a first set of tokens from the incoming e-mail; accessing a second set of tokens, corresponding to an e-mail stored in a spam database; determining a degree of similarity between the first set of tokens and the second set of tokens; and identifying the incoming e-mail as spam if the degree of similarity exceeds a predetermined threshold.

In accordance with another exemplary embodiment, a computer-implemented method for clustering a content item database is provided. by way of example, the method comprises assigning a content item in the content item database to a first cluster from among a plurality of clusters; identifying representative content items for each of the plurality of clusters; computing a mean vector for each of the plurality of clusters; computing a first distance between the content item and the mean vector for each of the plurality of clusters; reassigning the content item from the first cluster to a second cluster, if the mean vector for the second cluster has the smallest first distance from the content item; computing a second distance between the content item and the representative content item for each of the plurality of clusters; and reassigning the content item from the second cluster to a third cluster, if the representative content item for the third cluster has the smallest distance from the content item.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate one (several) embodiment(s) of the invention and together with the description, serve to explain the principles of the invention. In the drawings.

DETAILED DESCRIPTION OF THE EMBODIMENTS

Reference will now be made in detail to the present exemplary embodiments of the present disclosure, examples of which are illustrated in the accompanying drawings. Wherever possible, the same reference numbers will be used throughout the drawings to refer to the same or like parts.

Figure 1:
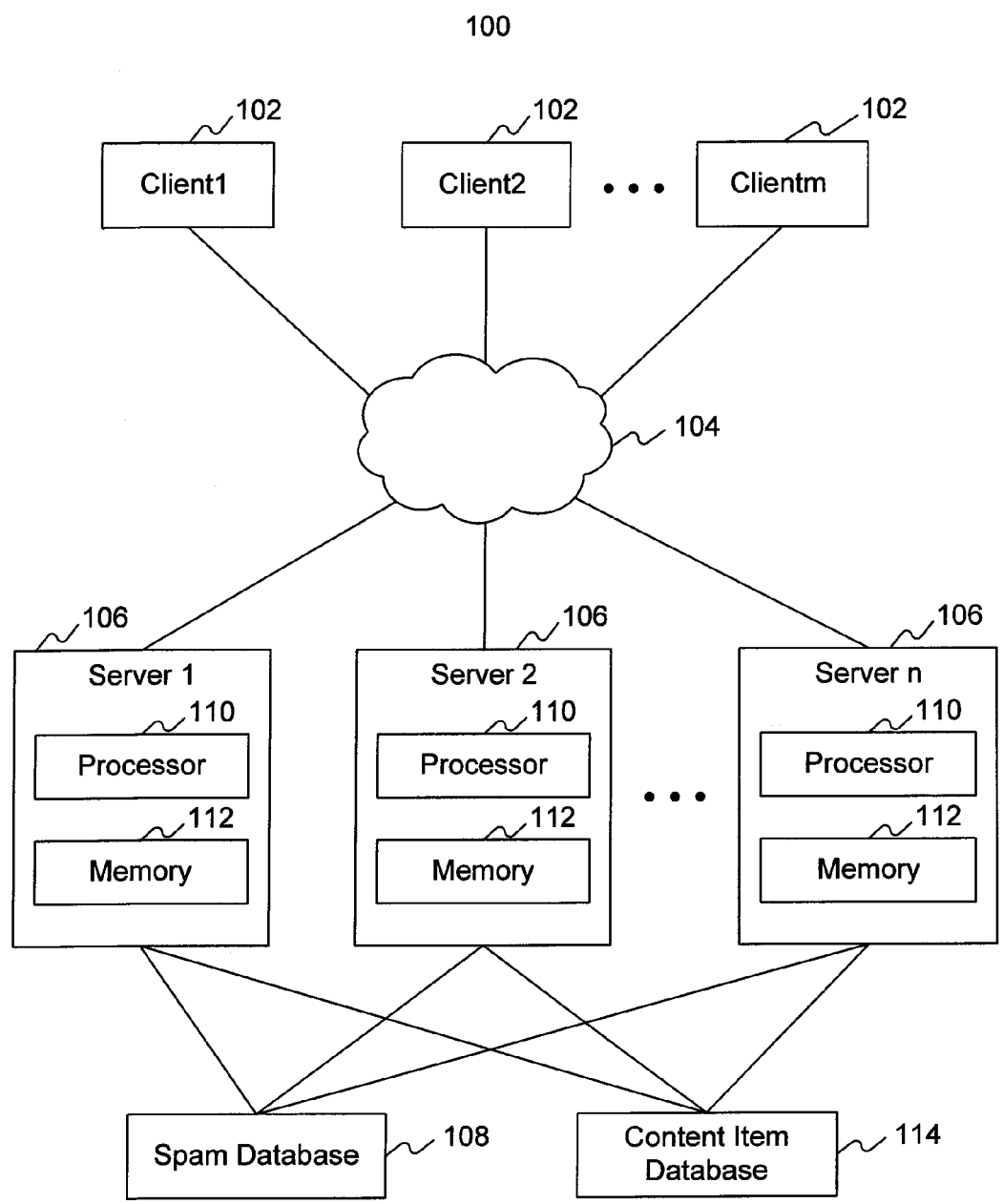
FIG. 1 shows an exemplary electronic communications system for implementing embodiments of the present disclosure.

FIG. 1 shows a block diagram of an exemplary electronic communications system 100 for implementing embodiments of the present disclosure, or aspects thereof. System 100 may include one or more clients 102 (e.g., Client 1, Client 2, . . . Client m). Clients 102 may be implemented with devices, and/or applications running thereon. By way of example, client 102 may include personal computers, laptops, tablet computers, personal digital assistants, mobile telephones, pagers, and/or other types of electronic communication devices. Clients 102 may be configured to communicate to and/or through communications medium 104. In certain embodiments, communications medium 104 may include any combination of communications networks. For example, communications medium 104 may include the Internet and/or another type of wide area network, an intranet, a metropolitan area network, a local area network, a wireless network, a cellular communications network, etc. In some embodiments, clients 102 may be configured to receive or initiate e-mail or other electronic communications, such as instant messaging, chat, text messaging, SMS messages, pager communications, blog posts, news items etc. Such communications may be generated by clients 102 and may be transmitted through communications medium 104 to appropriate servers, such as, for example, servers 106.

Servers 106 may include one or more servers (e.g., Server 1, Server 2, . . . Server n) configured to interact with the communications medium 104 and a spam database 108. Each server 106 may include a processor 110, a memory 112 for storing electronic communications and other data, and/or other storage devices (not shown), such as hard drives, NOR or NAND flash memory devices, or Read Only Memory (ROM) devices etc. In addition, consistent with some embodiments, servers 106 may be implemented as a server, a server system comprising a plurality of servers, or a server farm comprising a load balancing system and a plurality of servers.

The spam database 108 may include one or more logically and/or physically separate databases configured to store data. The data stored in the spam database 108 may be received from servers 106, and/or directly from clients 102. The data stored in the spam database 108 may take various forms including, but not limited to, e-mails, instant messages, chat messages, text messages, SMS messages, pager communications, and other electronic communications, or any combination thereof.

In certain embodiments, servers 106 may also be configured to interact with a content item database 114. The content item database 114 may include one or more logically and/or physically separate databases configured to store data. The data stored in the content item database 114 may be received from servers 106, and/or directly from clients 102. The data stored in the content item database 114 may take various forms including, but not limited to, e-mails, instant messages, chat messages, text messages, SMS messages, pager communications, blog posts, news items, and other electronic communications, or any combination thereof.

In some embodiments, spam database 108 and/or the content item database 114 may be implemented using a single computer-readable storage medium. In other embodiments, spam database 108 and/or the content item database may be maintained in a network attached storage device, in a storage area network, or combinations thereof, etc. Furthermore, spam database 108 and/or the content item database 114 may be maintained and queried using numerous types of database software and programming languages, such as SQL, MySQL, IBM DB2®, Microsoft Access®, PERL, C/C++, Java®, etc.

Although the above description describes clients and servers separately, clients may perform the role of servers and vice-versa. Additionally, clients 102 may have the same hardware components as servers 106. Thus, for example, clients 102 may also include processors 110, memory 112 for storing electronic communications and other data, and/or other storage devices such as hard drives, NOR, NAND, or ROM storage devices. Furthermore, the embodiments of this disclosure may also be implemented on the same device serving both as a client and a server.

Figure 2:
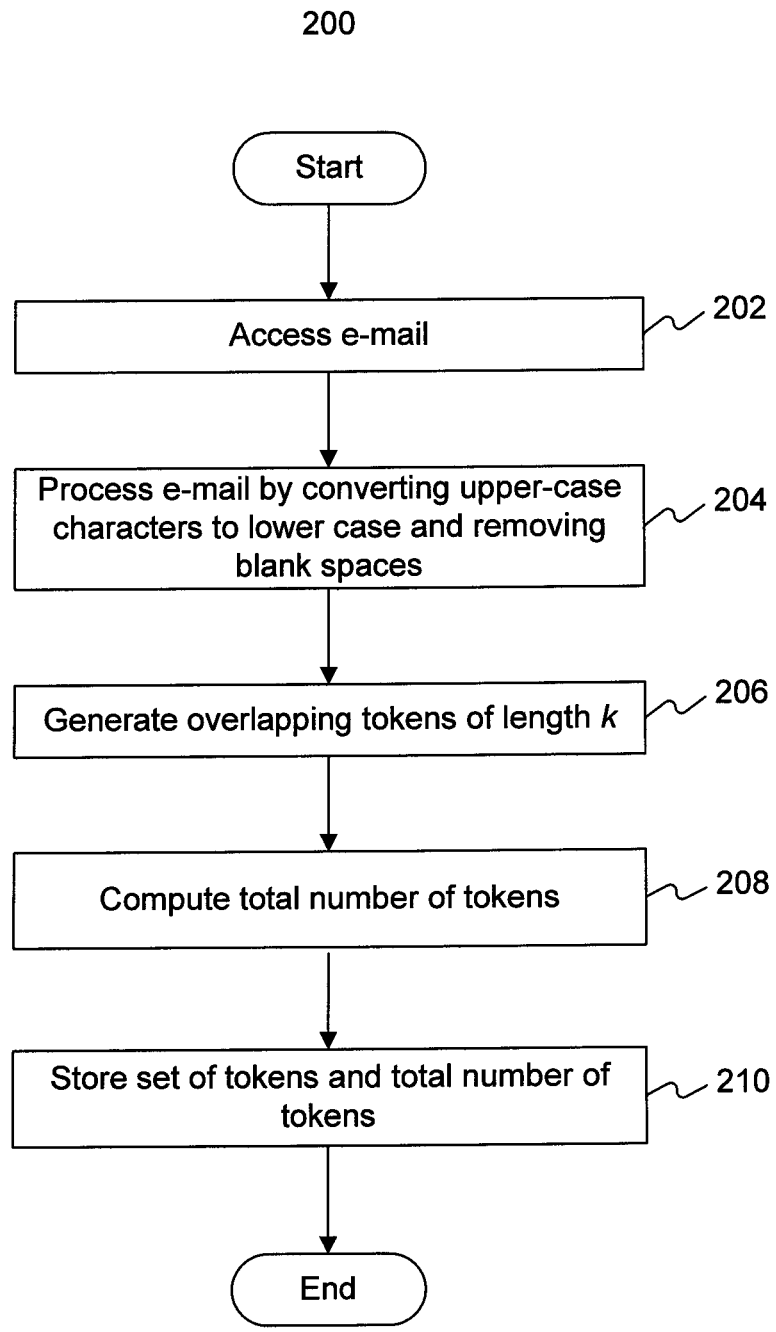
FIG. 2 shows an exemplary method of tokenizing an e-mail, consistent with an embodiment of the present disclosure.

FIG. 2 shows a flowchart of an exemplary process 200, consistent with an embodiment of the present disclosure. As further described below, the exemplary method of FIG. 2 may be implemented for tokenizing an electronic communication, such as an e-mail, or aspects thereof. For purposes of illustration, FIG. 2 is described below with reference to tokenizing an e-mail, such as an e-mail stored in spam database 108 or an e-mail received by any one of clients 102 or servers 106 through communications medium 104. It will be appreciated, however, that the process of FIG. 2 may be applied to other forms of electronic communications for purposes of tokenizing the same.

As shown in FIG. 2, process 200 may include a step 202 of accessing an e-mail. Accessing the e-mail may involve one of clients 102 or servers 106 receiving the e-mail through communications medium 104. Alternatively, accessing the e-mail may involve reading the e-mail from memory 112 or another type of storage device of one of clients 102 or servers 106.

Process 200 may also include a step 204 of processing the e-mail by converting all upper-case letters to lower-case letters and removing all blank spaces from the subject and body of the e-mail. Thus, for example, a subject reading "He is good he is he is" may be processed into a single string as: "heisgoodheisheis." Consistent with embodiments of the present disclosure, step 204 may be applied to the subject of the e-mail, the body of the e-mail, or to both the subject and the body of the e-mail.

In certain embodiments, step 204 of process 200 may be applied to the title, metadata, or key words corresponding to a content item in the content item data base 114. Step 204 may also be applied to the entire content item. Similarly step 204 may be applied to an incoming query.

As further illustrated in FIG. 2, process 200 may also include a step 206 of generating overlapping tokens, each token having a predetermined size k. Each token may consist of a sub-string containing one or more characters. In some embodiments, each successive token may contain one or more characters included in the immediately preceding token. Consider, for example, a particular e-mail string of length n obtained after processing an e-mail according to step 204, as described above. The number of overlapping tokens of size k, with k−1 overlapping characters, in the e-mail string is n−k+1, and the number of all possible similarly overlapping tokens of size k over the alphabet of size m is $N=m^k$. Thus, for example, generating overlapping tokens of length k=3 for the string "heisgoodheisheis" having a string length 16 would yield a set of fourteen tokens consisting of: "hei, eis, isg, sgo, goo, ood, odh, dhe, hei, eis, ish, she, hei, eis."

Process 200 may also include a step 208 of computing the total number of tokens generated in step 206. In addition, process 200 may include a step 210 of storing the set of tokens generated in step 206, and the total number of tokens computed in step 208 in a memory or other type of storage device. Step 210 may also include storing the number of occurrences of each unique token in the e-mail string. Further, step 210 may be implemented using hash table techniques, as described below. One of skill in the art would also appreciate that process 200 may be applied to all forms of electronic communication and is not limited to e-mails.

Figure 3:
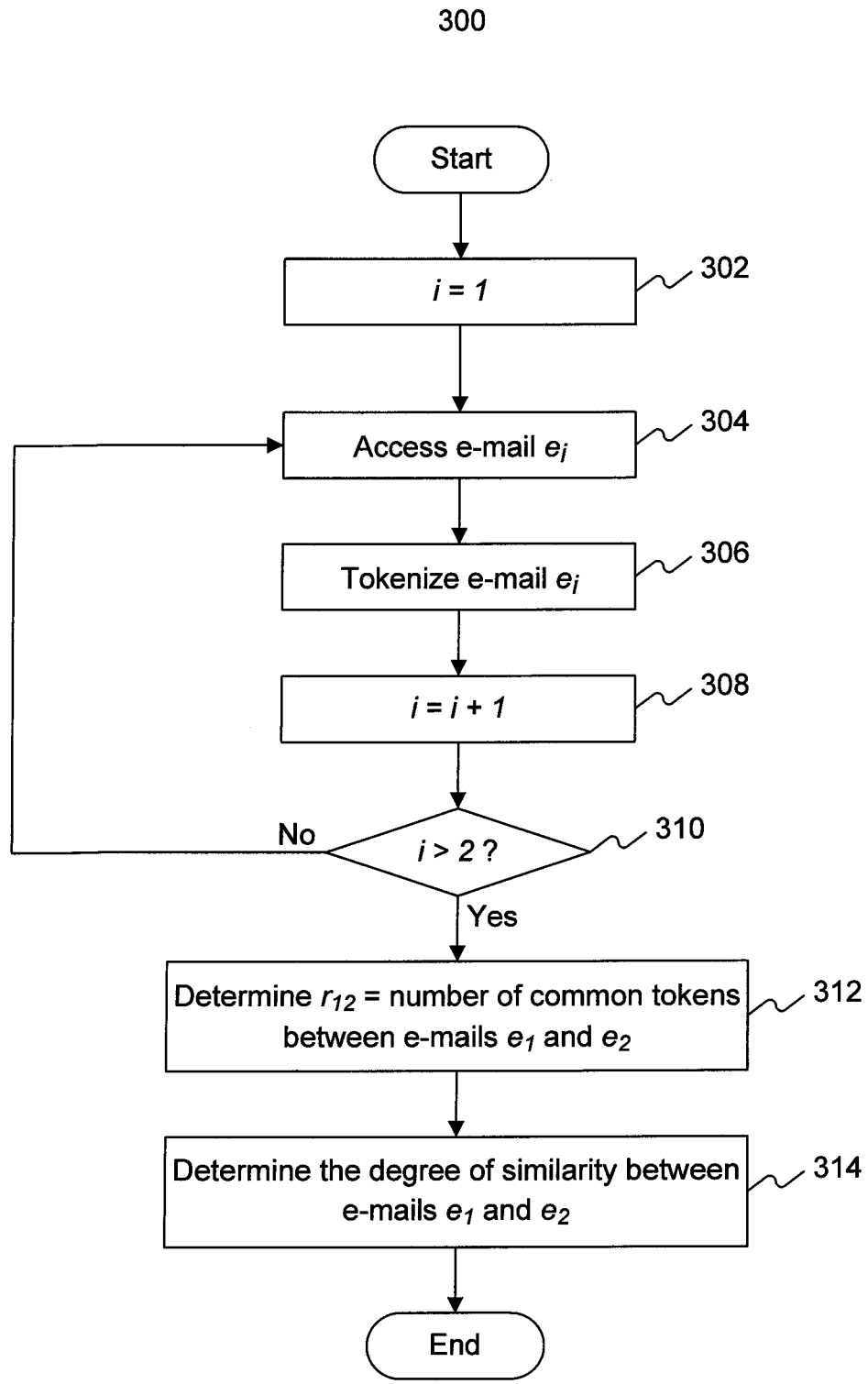
FIG. 3 shows an exemplary method of computing an easy signature, consistent with an embodiment of the present disclosure.

FIG. 3 shows a flowchart of an exemplary process 300 for computing an easy signature, consistent with an embodiment of the present disclosure. As will be appreciated from this disclosure, the exemplary method of FIG. 3 may be implemented to determine the degree of similarity between at least two e-mails or other electronic communications, a user query and a content item, or aspects thereof. For purposes of illustration, FIG. 3 is described below with reference to e-mails, such as e-mails stored in spam database 108 or e-mails received by any one of clients 102 or servers 106 through communications medium 104. It will be appreciated, however, that the process of FIG. 3 may be applied to other forms of electronic communications for analyzing the same.

Process 300 may include a step 302 where a counter i is set to keep a count of the number of e-mails which have been processed. Process 300 may also include a step 304 of accessing the e-mail $e_i$ corresponding to the counter i. Accessing the e-mail may involve one of clients 102 or servers 106 receiving the e-mail from the communications medium 104. Alternatively, accessing the e-mail may involve reading the e-mail stored in memory 112 or other type of storage device of one of clients 102 or servers 106.

Process 300 may also include a step 306 for tokenizing the e-mail $e_i$. In some embodiments, e-mail $e_i$ may be tokenized according to the process 200 previously described with reference to FIG. 2. Thus, for example, in step 306, a set of tokens of length k may be generated as described in step 206 and the total number of tokens may be computed as described in step 208. Process 300 may further include a step 308 to increment the counter "i" by 1.

Process 300 may also include a step 310 of determining if at least 2 e-mails have been accessed and tokenized. If two e-mails have not been tokenized, process 300 may proceed to step 304. If, however, for example, two e-mails $e_1$ and $e_2$ have been accessed and tokenized, process 300 may proceed to step 312 of determining the number of common tokens in the sets of tokens corresponding to e-mail $e_1$ and $e_2$.

Process 300 may also include a step 314 of determining the degree of similarity between two e-mails $e_1$ and $e_2$. In some embodiments, the degree of similarity may be estimated by computing an easy signature. The easy signature between two e-mails $e_i$ and $e_j$ may be estimated as:

$$ES(e_i, e_j) = \frac{|E_i \cap E_j|}{|E_i| + |E_j|} \quad (1)$$

where $E_i$ and $E_j$ are the sets of overlapping tokens of size k in the e-mail strings $e_i$ and $e_j$ respectively, and $|E_i|$ and $|E_j|$ are the number of overlapping tokens in the sets $E_i$ and $E_j$ respectively with repetitions allowed. The numerator in Equation (1) represents the number of common tokens in the two e-mail strings counting repeated tokens. Consider e-mail strings $e_i$ and $e_j$ of length $n_i$ and $n_j$ respectively. The number of overlapping tokens in $e_i$ may be computed as $t_i = n_i - k + 1$ and in $e_j$ may be computed as $t_j = n_j - k + 1$. The easy signature in Equation 1 may be rewritten as:

$$ES(e_i, e_j) = \frac{\sum_{x=1}^{r} \min(c_i^x, c_j^x)}{t_i + t_j} \quad (2)$$

where r is the minimum number of unique tokens in $e_i$ or $e_j$, and $c_i^x$ is the count of token x in $e_i$.

Thus, it can be seen that the easy signature $ES(e_i, e_j)$ between two strings $e_i$ and $e_j$ lies between 0 and 0.5. If $e_i$ and $e_j$ do not have any tokens in common, the intersection $E_i \cap E_j = 0$, the numerator of Equation (1) is zero, and the denominator is non-zero since $|E_i| \neq 0$ and $|E_j| \neq 0$. Therefore, $ES(e_i, e_j) = 0$. If, however, $e_i$ and $e_j$ are the same string $e_i$, then Equation (2) yields $$ES(e_i, e_i) = \frac{t_i}{2t_i} = 0.5.$$

The computation of the easy signature may be illustrated by an example. Consider, for example, two strings $e_i$="heisgoodheisheis" of length $n_i=16$ and $e_j$="heisokheis" of length $n_j=10$ over the English alphabet A={a, b, z}={1, 2, ..., 26} of m=26 lower case letters. The sets of overlapping tokens of size k=3 may be given by $E_i$={hei, eis, isg, sgo, goo, ood, odh, dhe, hei, eis, ish, she, hei, eis} and $E_j$={hei, eis, iso, sok, okh, khe, hei, eis}. The sets Ei and $E_j$ have repeated tokens. The size of $E_i$ is $t_i=14$ and that of $E_j$ is $t_j=8$. The count of token x=hei in $e_i$ is $c_j^{hei}=3$ and in $e_j$ is $c_j^{hei}=2$. The number of unique tokens in $e_i$ is 10, and in $e_j$ is 6, and r=min(10, 6)=6.

The easy signature between the pair of strings is ES ($e_i$, $e_j$)=(2+2+0+0+0+0)/(14+8)=4/22.

Spammers generally may modify an existing string say $e_i$, by permuting words, inserting or deleting parts of text, or misspelling words in $e_i$ to create a modified string $e_j$, which may then be transmitted in the spam campaign. Consistent with certain embodiments, implementations of the easy signature are robust to handle these activities.

Figure 4:
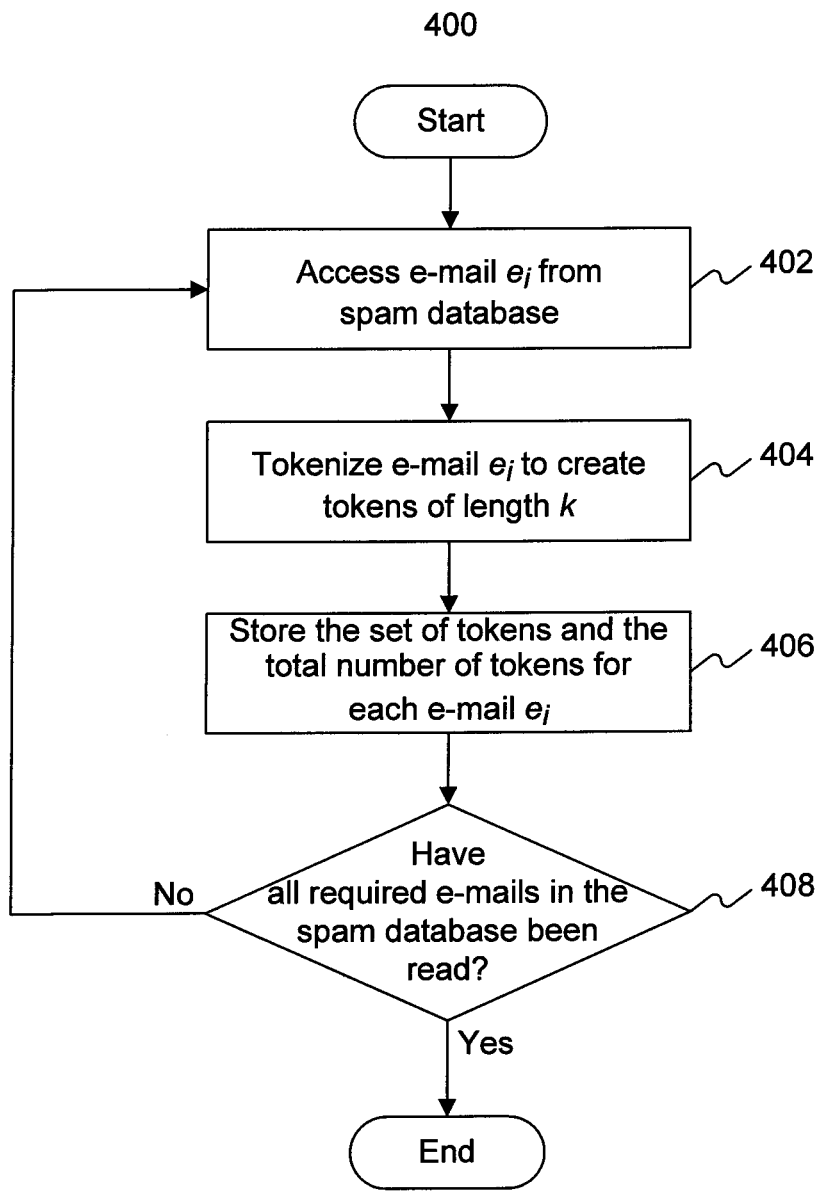
FIG. 4 shows an exemplary method of offline processing, consistent with an embodiment of the present disclosure.

FIG. 4 shows a flowchart of an exemplary process 400 for offline processing, consistent with an embodiment of the present disclosure. The exemplary method 400 of FIG. 4 may be implemented for providing offline processing by servers 106, for example. The offline processing may be performed in advance or on a periodic basis. Additionally, or alternatively, the offline processing may be initiated by a server administrator. Moreover, as will be appreciated from the following description, the exemplary process 400 may be performed on some or all e-mails stored in the spam database 108. While the following description of FIG. 4 is presented with references to e-mails, the exemplary process 400 can be implemented for other forms of electronic communications, consistent with embodiments of the present disclosure.

As illustrated in FIG. 4, process 400 may include a step 402 of accessing an e-mail stored in the spam database 108. Accessing the e-mail may involve reading the e-mail directly from spam database 108 or from another suitable memory device. Process 400 may also include a step 404 of tokenizing the e-mail accessed in step 402. In some embodiments, tokenizing of the e-mail may be performed, for example, according to the process 200 (FIG. 2) described above. Process 400 may further include a step 406 of storing the set of tokens created in the tokenizing step 402 and the total number of tokens in a memory or other type of storage device. Step 406 may also include storing the number of occurrences of each unique token created in the tokenizing step 402. In certain embodiments, step 406 may be implemented using hash table techniques.

An exemplary hash table technique for storing the set of tokens and the number of tokens will be described next. Consider an exemplary alphabet of letters that are indexed by m numbers as A={$a_1, a_2, \ldots, a_m$}={1, 2, ..., m}. A token t of length k is a string of k letters t=$s_1 s_2 \ldots s_i \ldots s_k$, with $s_i \in A$. The hash index of t is defined as:

$$\text{hash}(t) = \sum_{i=1}^{m} m^i \text{index}(s_i) \quad (3)$$

where index($s_i$) $\in$ {1, 2, m}. Thus, for example, the hash index of token t=hei of the example described above may be estimated as hash(hei)=index(h)$26^3$+index(e)$26^2$+index(i)$26^1$=8*$26^3$+5*$26^2$+9*26=12376. Hence 12376 is the index location of the token hei. Thus, for example, during offline processing the set of tokens corresponding to each e-mail in the spam database 108 may be stored in a hash table H indexed by their hash value. For each token x, the e-mail $e_j$ in which it occurs followed by its count $c_j^x$ may be stored in H. Since the most frequent occurrence of x in the various e-mails stored in the spam database 108 is required, the e-mails containing token x may be sorted by decreasing count value. Thus, hash(x) may contain entries of the form ($e_j$, $c_j^x$), ($e_k$, $c_k^x$), ... sorted by the count index.

Process 400 may also include a step 408 of determining whether all required e-mails in the spam database 108 have been tokenized. If all required e-mails in the spam database 108 have not been tokenized, process 400 may return to step 402 to continue tokenizing the remaining e-mails in the spam database 108. If, however, all the e-mails in the spam database 108 have been tokenized, process 400 may end offline processing.

Figure 5:
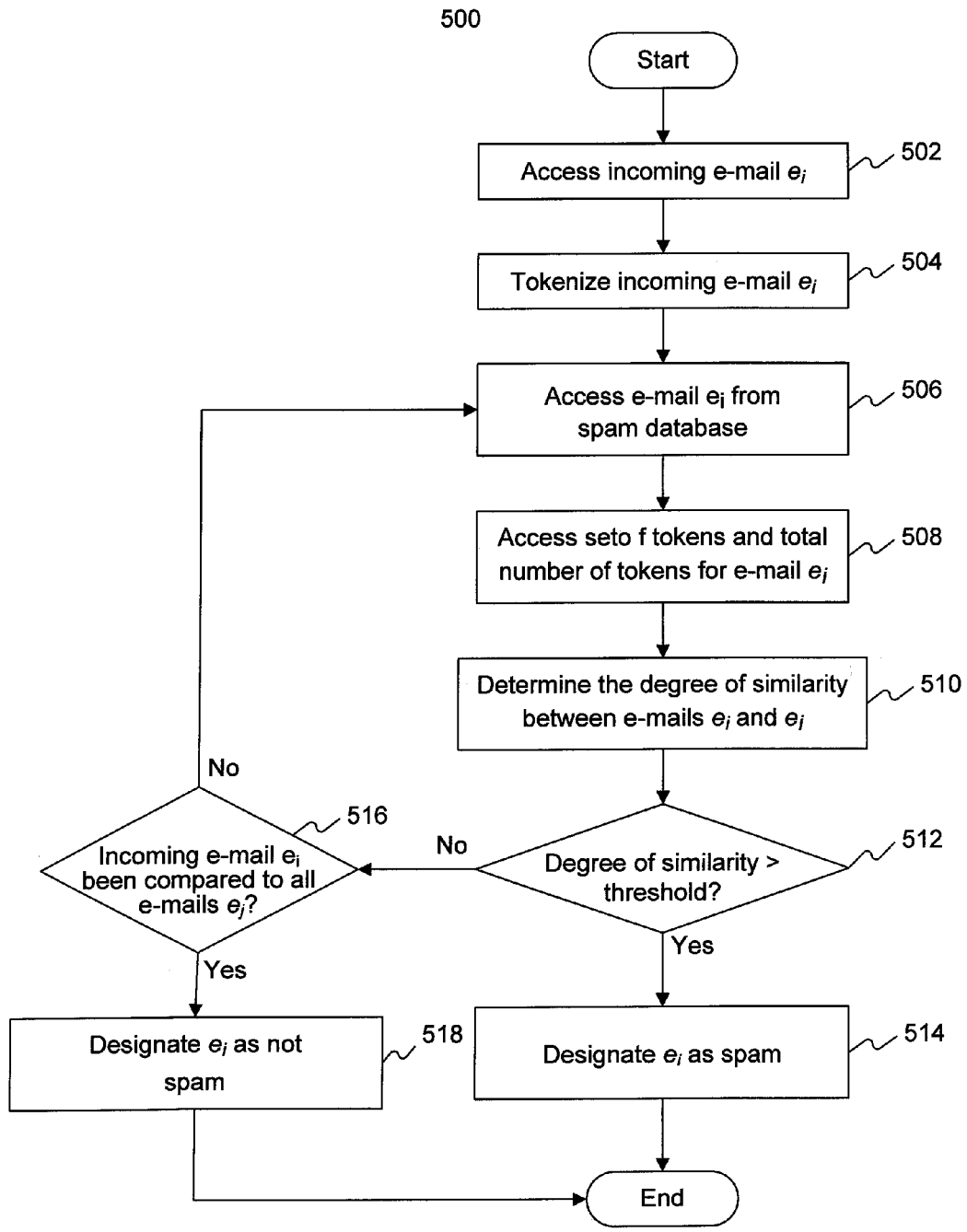
FIG. 5 shows an exemplary method of online processing for identifying an incoming electronic communication as spam, consistent with an embodiment of the present disclosure.

FIG. 5 shows a flowchart of an exemplary process 500 related to online processing, consistent with an embodiment of the present disclosure. The exemplary process 500 may be implemented for identifying an incoming e-mail as spam. This process may be performed immediately when one of clients 102 or servers 106 receives an incoming e-mail through communications medium 104. Alternatively, process 500 may also be performed at a later time by accessing the incoming e-mail from memory 112 or another storage device of one of clients 102 or servers 106. From the following description, it will also be appreciated that while FIG. 5 is described with reference to e-mails, the process 500 may also implemented for other forms of electronic communications consistent with the embodiments of the present disclosure.

According to FIG. 5, process 500 may include a step 502 of accessing an incoming e-mail $e_i$. Accessing the e-mail may involve one of clients 102 or servers 106 receiving the e-mail through communications medium 104. Alternatively, accessing the e-mail may involve reading the e-mail stored in memory 112 or another storage device of one of clients 102 or servers 106.

Process 500 may also include a step 504 of tokenizing the incoming e-mail $e_i$. In some embodiments, tokenizing may be performed according to process 200, as described above with reference to FIG. 2.

Process 500 may also include a step 506 of accessing an e-mail $e_j$ stored in the spam database 108. Accessing the e-mail $e_j$ may involve reading the e-mail $e_j$ directly from spam database 108 or from another suitable memory device. In addition, process 500 may include a step 508 of accessing the set of tokens and the total number of tokens, corresponding to the e-mail $e_j$. In some embodiments, the step 508 of accessing may include accessing the set of tokens and the total number of tokens corresponding to the e-mail $e_j$ from a hash table.

Process 500 may also include a step 510 of estimating a degree of similarity between the e-mails $e_i$ and $e_j$ based on their respective sets of tokens. In some embodiments, the degree of similarity may be estimated, for example, by computing an easy signature between the e-mails $e_i$ and $e_j$ according to process 300 as described above.

Process 500 may also include a step 512 for determining whether the degree of similarity estimated in step 510 exceeds a predetermined threshold. In some embodiments, the easy signature between the e-mails $e_i$ and $e_j$ may be compared to a predetermined threshold in step 512. If the degree of similarity is determined to have exceeded the predetermined threshold, the incoming e-mail $e_i$ may be identified as spam in step 514.

Further, in some embodiments, the set of tokens corresponding to e-mail $e_i$ may be hashed and compared to the corresponding tokens in the hash table H storing the set of tokens and the count for each token corresponding to e-mails in the spam database. Equation 2 shows that the denominator can be pre-computed for each e-mail $e_j$ in the spam database. Thus, for example, evaluation of the condition in step 512 may be performed as:

$$\sum_{x=1}^{r} \min(c_i^x, c_j^x) > T(t_i + t_j) = T_{ij} \quad (4)$$

where T represents the pre-determined threshold. The sum in Equation (4) may run over many tokens. To speed up the algorithm, the sum may be stopped as soon as it exceeds the threshold $T_{ij}$ and e-mail $e_i$ may be identified as spam.

Referring again to step 512, if the degree of similarity estimated in step 512 is determined to not exceed the threshold, process 500 may proceed to a step 516 of determining whether the incoming e-mail $e_i$ has been compared with all e-mails $e_j$ in the spam database 108. If it is determined that the incoming e-mail $e_i$ has not been compared with all e-mails $e_j$ in the spam database, process 500 may return to step 506 of reading another e-mail $e_j$ from the spam database 508. Process 500 may also proceed to steps 508, 510, and 512.

Referring again to step 516, if it is determined that all e-mails $e_j$ in the spam database 108 have already been compared to the incoming e-mail $e_i$, process 500 may proceed to step 518 of determining that the incoming e-mail $e_i$ is not spam.

Figure 6:
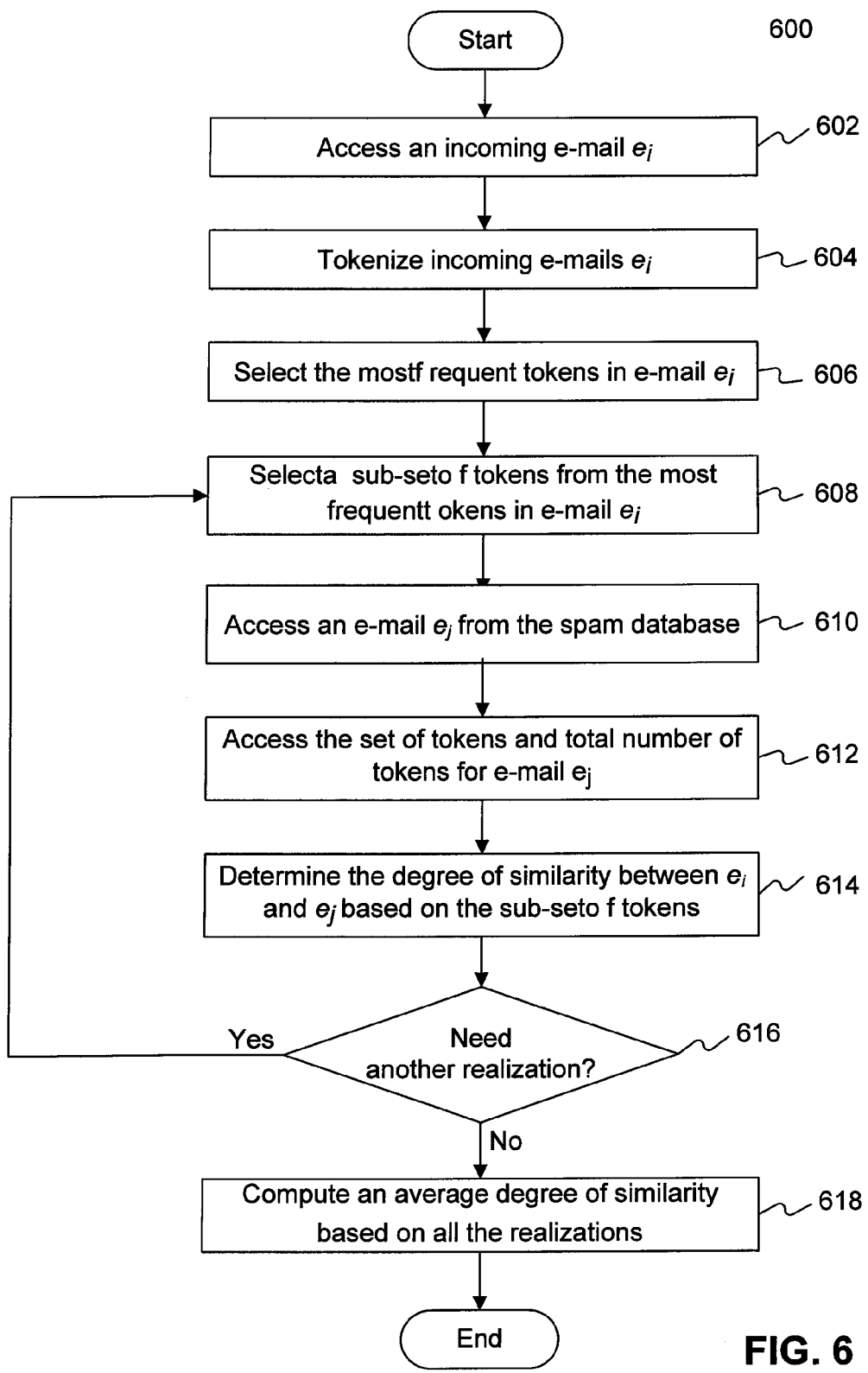
FIG. 6 shows an exemplary method of computing an average easy signature based on a randomized, statistical anti-spam algorithm, consistent with an embodiment of the present disclosure.

Equation 4 described above illustrates that the running time of the algorithm can be made faster if a random subset of tokens are selected from the incoming e-mail $e_i$ and compared to the corresponding tokens for the e-mail $e_j$ selected from the spam database 108. FIG. 6 shows a flowchart of an exemplary process 600 for determining a degree of similarity based on a randomly selected set of tokens, consistent with an embodiment of the present disclosure. As with process 500, process 600 may be performed immediately when clients 102 or servers 106 receive an incoming e-mail through communications medium 104. Alternatively, process 600 may be performed at a later time by accessing the incoming e-mail from memory 112 or another storage device of one of clients 102 or servers 106. As with the other embodiments disclosed herein, the exemplary process 600 may be adapted to analyze other types of electronic communications besides e-mails.

Process 600 may include a step 602 of accessing an incoming e-mail $e_i$. Accessing the e-mail $e_i$ may involve one of clients 102 or servers 106 receiving the e-mail through communications medium 104. Alternatively, accessing the e-mail $e_i$ may involve reading the e-mail stored in memory 112 or another storage device of one of clients 102 or servers 106.

Process 600 may also include a step 604 of tokenizing the incoming e-mail $e_i$. In some embodiments, tokenizing may be performed according to the process 200 (FIG. 2) described above. Process 600 may further include a step 606 of identifying the most frequent tokens in the set of tokens corresponding to e-mail $e_i$. In addition, process 600 may include a step 608 of randomly selecting a sub-set of tokens from the set of most frequently occurring tokens identified in step 606.

As further illustrated in FIG. 6, the exemplary process 600 may also include a step 610 of accessing an e-mail $e_j$ stored in the spam database 108. Accessing the e-mail $e_j$ may involve reading the e-mail directly from spam database 108 or from another memory device. In addition, process 600 may include a step 612 of accessing the set of tokens and the total number of tokens, corresponding to the e-mail $e_j$, stored in memory or another storage device. In some embodiments, the step 608 of accessing may include accessing the set of tokens and the total number of tokens corresponding to the e-mail $e_j$ from a hash table.

Process 600 may also include a step 614 of determining the degree of similarity between e-mails $e_i$ and $e_j$ based on the sub-set of tokens selected in step 608. In certain embodiments, the degree of similarity may be estimated by computing a randomized easy signature. The randomized easy signature between two e-mails $e_i$ and $e_j$ may be estimated as:

$$RS(e_i, e_j) = \frac{|E_i^r \cap E_j|}{|E_i^r| + |E_j|} \quad (5)$$

where $E_i^r$ is the random collection of tokens sampled from the query string $e_i$ from a set of most frequent tokens in step 508. Similar to Equation (2), the random signature may be estimated as a sum over random tokens as:

$$RS(e_i, e_j) = \frac{\sum_{x=1}^{p} \min(c_i^x, c_j^x)}{t_i^r + t_j} \quad (6)$$

where p is the number of unique random tokens sampled, and $t_i^r$ is the number of random tokens in $e_i$. The randomized easy signature $RS(e_i, e_j)$ may be averaged over different realizations and an average randomized easy signature $AS(e_i, e_j)=AS_{ij}$ may be computed as:

$$AS(e_i, e_j) = E[RS(e_i, e_j)] = \frac{\sum_{\omega=1}^{y} RS_{ij}(\omega)}{y} \quad (7)$$

where E is the ensemble average and y is the number of realizations.

Referring back to FIG. 6, process 600 may include a step 616 of determining whether another realization is required. If it is determined in step 616 that another realization is required, process 600 may return to step 608. Process 600 may also proceed to steps 610, 612, and 614. If it is determined in step 616 that another realization is not required, process 600 may proceed to step 618 of computing the average randomized easy signature according to Equation (7).

Equation (6) shows that the randomized easy signature may be computed by summing over r tokens. The numerator in Equation (6) involves a minimum over the counts of the tokens between the pair of e-mails $e_i$ and $e_j$. Thus, for example, in some embodiments the r most frequent tokens corresponding to all e-mails in the spam database 108 may be sampled and computation of the randomized easy signature may be stopped when the partial sum exceeds the predetermined threshold for some number of tokens r'<r. In other embodiments, a subset r" of the r most frequent tokens corresponding to the incoming e-mail $e_i$ may be sampled and computation of the randomized easy signature may be stopped when the partial sum exceeds the predetermined threshold. In yet another set of embodiments, a sub-set of the most frequent tokens corresponding to all the e-mails stored in the spam database 108 and a subset of the most frequently occurring tokens in the incoming e-mail $e_i$ may be sampled and computation of the randomized easy signature may be stopped when the partial sum exceeds the predetermined threshold.

Consistent with certain embodiments, spam database 108 may continuously collect spam e-mails and/or other electronic communications over a period of time. As a result, there may be temporal redundancy in the spam database 108, such that several of the e-mails or other electronic communications may be related. In certain embodiments, the e-mails and/or other electronic communications in the spam database 108 may be clustered. By way of example, from each cluster, a representative e-mail may be defined. In such a case, the degree of similarity between an incoming e-mail and only the representative e-mail from each cluster may be used to identify the incoming e-mail as spam, increasing the speed and efficiency of the anti-spam algorithm.

Thus, for example, each e-mail $e_j$ in the spam database may be represented as a vector $\vec{v}_j=(c_1^j, c_2^j, \ldots, c_k^j, \ldots, c_n^j)$, where $c_k^j$ represents the count of the $k^{th}$ token in $e_j$. In this representation, each e-mail may be represented as a point in a n-dimensional space. Similar e-mails may be clustered using the K-means algorithm, with a pre-specified number of clusters K. Initially, the clusters may be formed randomly such that for a spam database containing n spam e-mails, each cluster may contain n/K e-mail vectors. For each cluster, a mean vector $m_j$ may be defined such that the count $c_k^j$ for the $k^{th}$ token, in the mean vector, is the average of the counts of that token in the e-mails included in that cluster. After defining the cluster mean, each e-mail in the spam database may be compared to the cluster means of each cluster by computing a distance $D_{ij}$ between each e-mail $e_j$. The e-mail $e_j$ may be re-assigned to the cluster whose mean vector has the smallest distance from the e-mail $e_j$.

In certain embodiments, a cosine distance may be used and the e-mail $e_j$ may be re-assigned to the cluster whose mean vector has the largest cosine distance from e-mail $e_j$. After re-assigning e-mail $e_j$ to a different cluster, the mean vector $m_j$ for each cluster may be recomputed. The process of reassigning e-mails to other clusters and updating of the cluster means may be repeated until there is no further movement of e-mails from one cluster to another. Once the K clusters are formed, the K representative e-mails which represent the cluster means may be identified as the e-mails having means closest to the cluster mean. It will be apparent to those skilled in the art that although clustering has been described for e-mails in a spam database, the same process could be used to cluster any type of content item stored in a content item database.

An incoming e-mail $e_i$ may be designated as spam by determining the degree of similarity between the incoming e-mail $e_i$ and each of the representative e-mails from the K clusters in the spam database 108. If the degree of similarity is determined to exceed a pre-determined threshold, then $e_i$ may be classified as spam. In certain embodiments, the degree of similarity may be determined by computing an easy signature as described in process 300. Alternatively, and to increase the speed and efficiency of the algorithm, in some embodiments, the degree of similarity may be determined by computing a randomized easy signature and an average randomized easy signature as described in process 600. To further increase speed, the incoming e-mail $e_i$ may be only compared with the clusters, whose representative e-mails have the largest easy signature with the query e-mail $e_i$.

Figure 7:
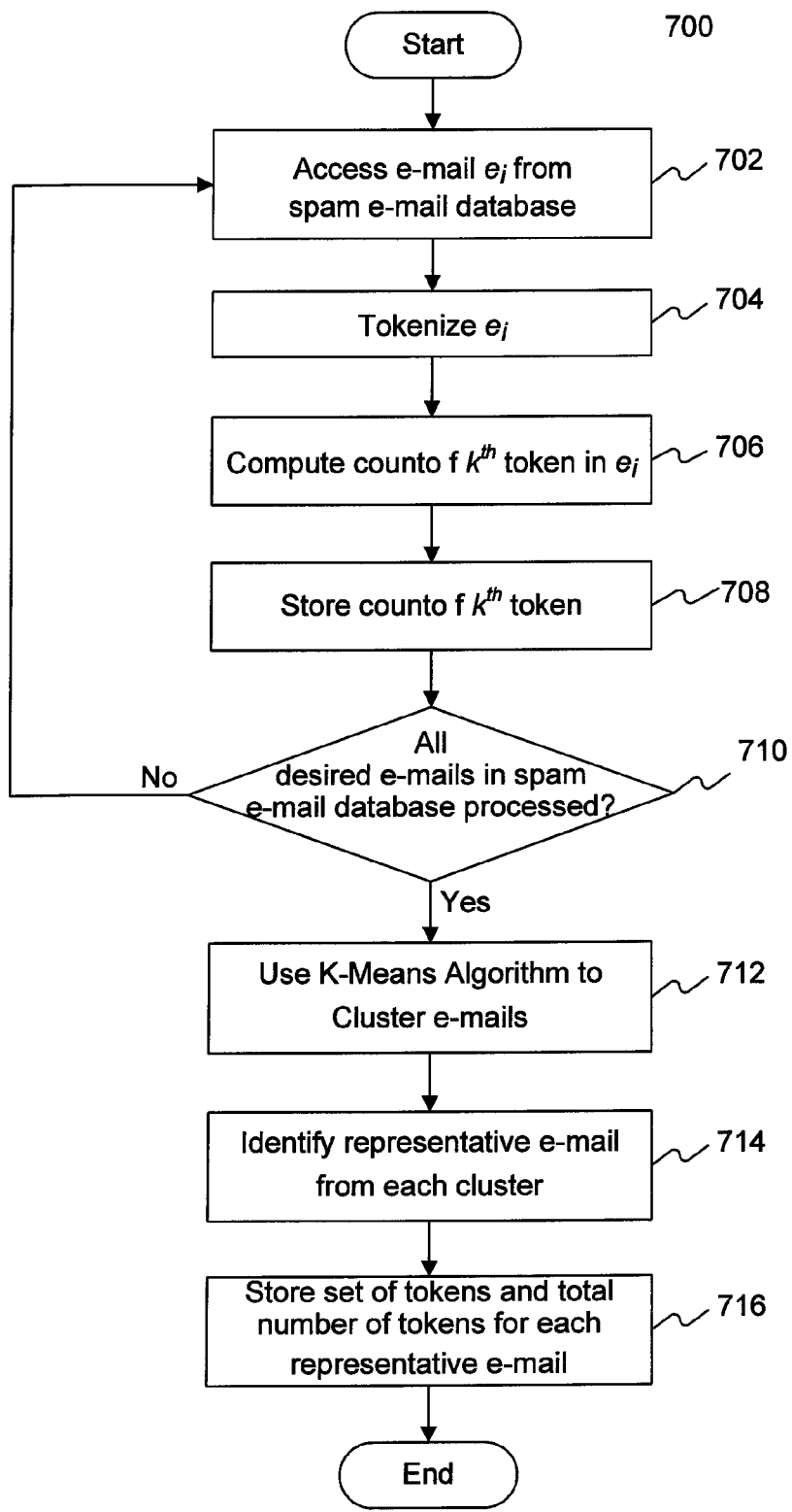
FIG. 7 shows an exemplary method of clustering e-mails in a spam database using a K-means algorithm, consistent with an embodiment of the present disclosure.

FIG. 7 shows a flowchart of an exemplary process 700 for processing and clustering e-mails or other electronic communications, consistent with an embodiment of the present disclosure. The exemplary process 700 may be implemented to cluster e-mails stored in, for example, spam database 108. Furthermore, process 700 may be performed as an offline process on a periodic basis. Alternatively, process 700 may be performed each time one of clients 102 or servers 106 receive an incoming e-mail. Additionally, or alternatively, process 700 may be performed when initiated by a server administrator. Process 700 may be performed on some or all the e-mails (or other electronic communications) stored in the spam database 108.

Process 700 may include a step 702 of accessing an e-mail stored in the spam database 108. Accessing the e-mail may involve reading the e-mail directly from spam database 108 or from another suitable memory device. Process 700 may also include a step 704 of tokenizing the e-mail accessed in step 702. Tokenizing of the e-mail may be performed, for example, according to the process 200 (FIG. 2) described above.

As shown in FIG. 7, process 700 may also include a step 706 of computing $c_k^j$, the count of the $k^{th}$ token in $e_j$. Process 700 may further include a step 708 of storing the count of the $k^{th}$ token computed in step 708 in a memory or other storage device. In certain embodiments, storage of the count of the $k^{th}$ token may be performed according to the hash table techniques described above.

Process 700 may also include a step 710 of determining whether all the desired e-mails in the spam database 108 have been processed. If it is determined that all desired e-mails have not been processed, process 700 may proceed to step 702 and may perform steps 704, 706, and 708 for another e-mail stored in the spam database 108.

Referring back to step 710, if all desired e-mails in the spam database 108 have been processed, process 700 may proceed to a step 712 of clustering the e-mails in the spam database 108 using a K-means algorithm, as described above. Process 700 may further include a step 714 of identifying representative e-mails for each cluster based on a distance or cosine distance of the representative e-mail from the cluster mean, as described above. In addition process 700 may include a step 716 of storing the set of tokens and the total number of tokens for each e-mail identified as a representative e-mail in step 714. In some embodiments, step 716 may store the set of tokens and the total number of tokens using a hash table.

In another embodiment, the cluster formation may be refined even further. Thus, for example, after forming the K clusters as described above, an additional process step may be performed. In this additional step, the distance $D_{ij}$, of each e-mail in the spam database from each of the K representative e-mails corresponding to the K clusters may be obtained. An e-mail in the spam database may be reassigned to a different cluster if it has the smallest distance from the representative e-mail of the different cluster. After reassigning the particular e-mail, the mean vector for each cluster may be recomputed. The process of reassigning e-mails to other clusters and updating of the cluster means may be repeated until there is no further movement of e-mails from one cluster to another.

In yet another embodiment, refinement of the clusters may be performed using the cosine distance. Thus, for example, after forming the K clusters as described above, an additional step of computing the cosine distance of each e-mail in the spam database from each of the K representative e-mails corresponding to the K clusters may be performed. An e-mail in the spam database may be reassigned to a different cluster if it has the largest cosine distance from the representative e-mail of the different cluster. After reassigning the particular e-mail, the mean vector for each cluster may be recomputed. The process of reassigning e-mails to other clusters and updating of the cluster means may be repeated until there is no further movement of e-mails from one cluster to another. Such refinement of the cluster formation may result in a significant improvement in spam detection rates using the methods described below. Further, as discussed elsewhere in this specification, process 700 is not limited to clustering e-mails in a spam database but may be used to cluster any type of content item stored in a content item database.

In certain embodiments e-mails may be reassigned from one cluster to another when the easy signature computed, for example, according to the process 200, between the e-mail and the mean vector of a cluster exceeds a particular threshold. Further, a clustering algorithm based on computation of easy signatures may be further refined by reassigning an e-mail from one cluster to another if the easy signature computed, for example, according to the process 200, between the e-mail and the representative e-mail of the other cluster exceeds another threshold.

Spammers often change their strategies. Consequently, the content of the spam e-mail also changes frequently. To account for the changing nature of spam, the spam database 108 may be frequently updated using a feedback mechanism. For each spam e-mail $e_j$ in database 108, a counter Cj may be stored to keep track of the number of times an incoming e-mail $e_i$ is identified as spam based on its degree of similarity with the spam e-mail $e_j$. The count may be averaged over a period of time P. Further, if the averaged count $A_j=C_j/P$ is less than a second threshold $\alpha$, $e_j$ may be removed from the spam database 108. In this way, only the most active e-mails that match the spammers' activities or changing trends may be stored in the spam database. This increases the efficiency of the algorithm and also reduces the storage requirements of the database. Furthermore, spam database 108 may be updated more frequently or less frequently using this process depending on the resources available to a database manager.

Figure 8:
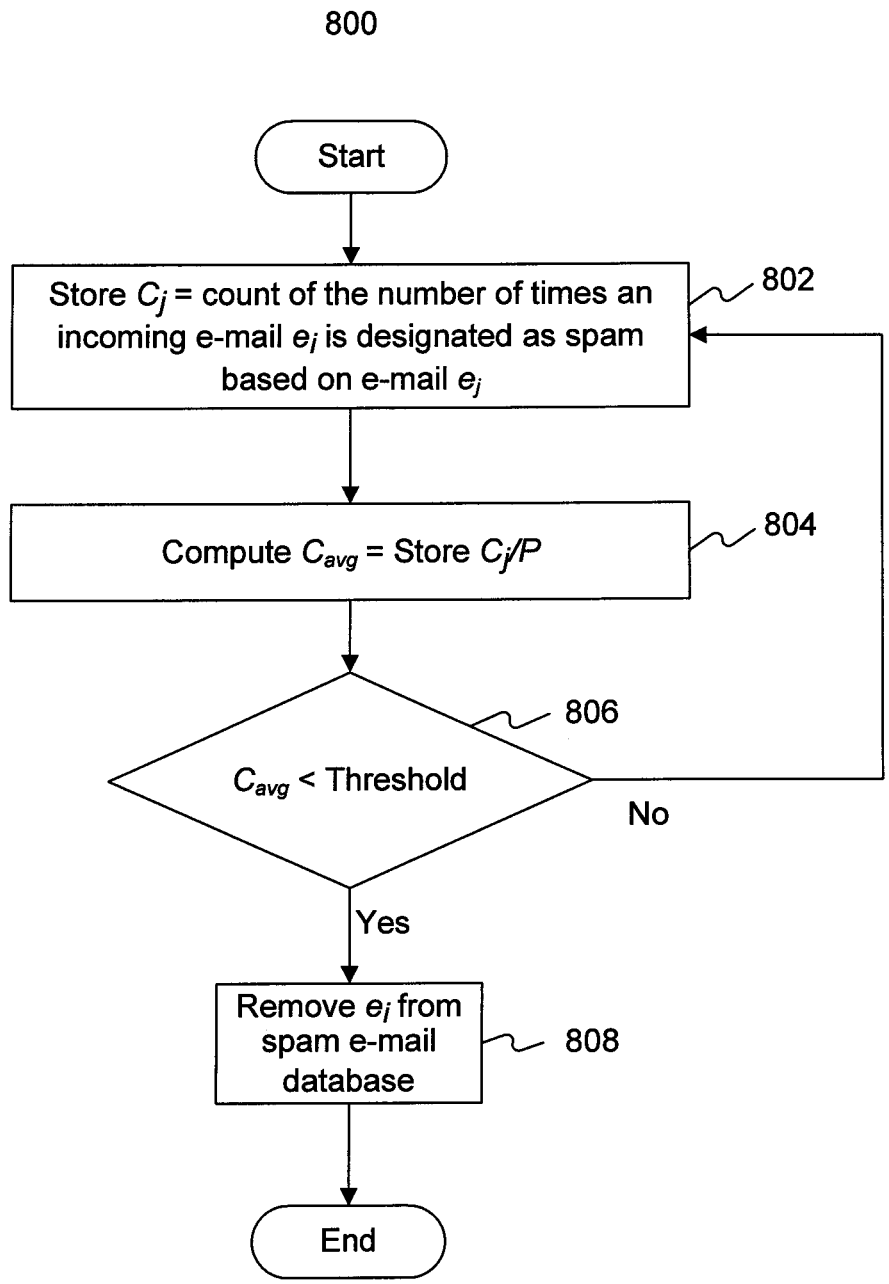
FIG. 8 shows an exemplary method of updating a spam database, consistent with an embodiment of the present disclosure.

FIG. 8 shows a flowchart of an exemplary process 800 for updating e-mails or other electronic communications stored in spam database 108, consistent with an embodiment of the present disclosure. The exemplary process 800 of FIG. 8 may be implemented using a feedback mechanism. Furthermore, process 800 may be performed as an offline process on, for example, a periodic basis. Process 800 may also be performed when initiated by a server administrator or database manager.

As illustrated in FIG. 8, process 800 may include a step 802 of storing a counter $C_j$ representing the number of times an incoming e-mail $e_i$ is identified as spam based on its degree of similarity with the spam e-mail $e_j$. The counter $C_j$ may be incremented every time e-mail $e_j$ results in determining an incoming e-mail $e_i$ as spam over a period of time P.

Process 800 may also include a step 804 of computing an average value $C_{avg}$ of the counter $C_j$ over the time period P. Process 800 may further include a step 806 of determining whether the average count $C_{avg}$ is less than a second pre-determined threshold. If it is determined that $C_{avg}$ is less than the second pre-determined threshold, process 800 may proceed to a step 808 of removing the e-mail $e_j$ from the spam database 108.

Figure 9:
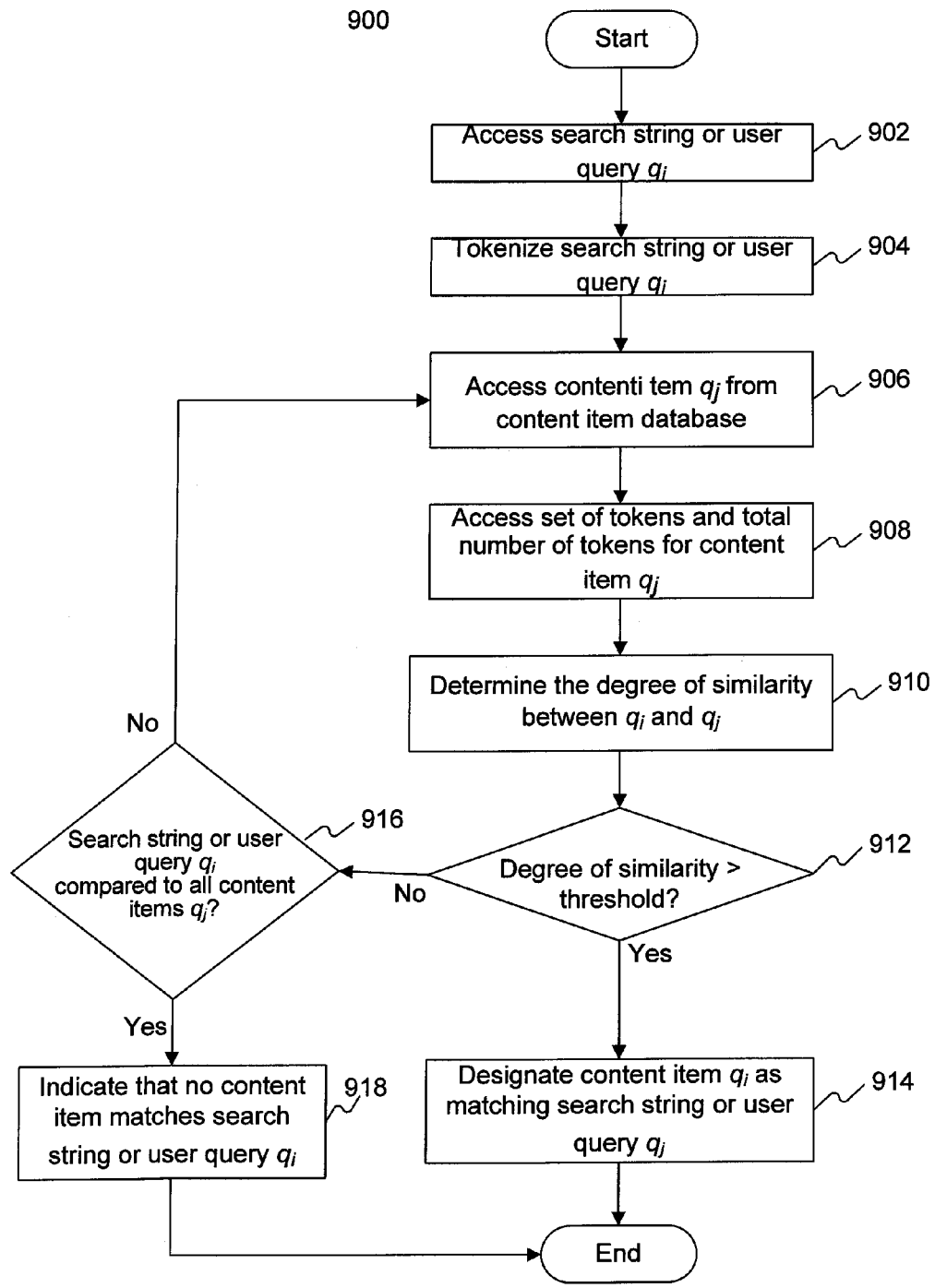
FIG. 9 shows an exemplary method of identifying a content item from the content item database that matches a query from a user, consistent with an embodiment of the present disclosure.

FIG. 9 shows a flowchart of an exemplary process 900 related to searching for a desired content item from a content item database, consistent with an embodiment of the present disclosure. The exemplary process 900 may be implemented for searching for a content item using the query or search string provided by a user. This process may be performed immediately when one of clients 102 or servers 106 receives a query from a user through communications medium 104. Alternatively, process 900 may also be performed at a later time by accessing the search query from memory 112 or another storage device of one of clients 102 or servers 106.

According to FIG. 9, process 900 may include a step 902 of accessing a search string or user query $q_i$ ("incoming query"). Accessing the incoming query may involve one of clients 102 or servers 106 receiving the query through communications medium 104. Alternatively, accessing the incoming query may involve reading the query stored in memory 112 or another storage device of one of clients 102 or servers 106.

Process 900 may also include a step 904 of tokenizing the incoming query $q_i$. In some embodiments, tokenizing may be performed according to process 200, as described above with reference to FIG. 2.

Process 900 may also include a step 906 of accessing a content item $q_j$ stored in the content item database 114. Accessing the content item $q_j$ may involve reading the content item $q_j$ directly from content item database 114 or from another suitable memory device. In addition, process 900 may include a step 908 of accessing the set of tokens and the total number of tokens, corresponding to the content item $q_j$. The set of tokens corresponding to the content item $q_j$ may be obtained by tokenizing, according to the process 200, the title of the content item, its metadata, keywords representing the content item, etc. In some embodiments, the step 908 of accessing may include accessing the set of tokens and the total number of tokens corresponding to the content item $q_j$ from a hash table.

Process 900 may also include a step 910 of estimating a degree of similarity between the incoming query $q_i$ and the content item $q_j$ based on their respective sets of tokens. In some embodiments, the degree of similarity may be estimated, for example, by computing an easy signature between the incoming query $q_i$ and the content item $q_j$ according to process 300 as described above.

Process 900 may also include a step 912 for determining whether the degree of similarity estimated in step 910 exceeds a predetermined threshold. In some embodiments, the easy signature may be compared to a predetermined threshold in step 912. If the degree of similarity is determined to have exceeded the predetermined threshold, the content item $q_j$ may be identified as a content item that matches the incoming query $q_i$ in step 914.

Further, in some embodiments, the set of tokens corresponding to the incoming query $q_i$ may be hashed and compared to the corresponding tokens in the hash table H storing the set of tokens and the count for each token corresponding to the content items in the content item database.

Referring again to step 912, if the degree of similarity estimated in step 912 is determined to not exceed the threshold, process 900 may proceed to a step 916 of determining whether the incoming query $q_i$ has been compared with all content items $q_j$ in the content item database 114. If it is determined that the incoming query $q_i$ has not been compared with all the content items $q_j$ in the content item database, process 900 may return to step 906 of reading another content item $q_j$ from the content item database 114. Process 900 may also proceed to steps 908, 910, and 912.

In some embodiments, the incoming query $q_i$ may be compared only to the cluster means for each cluster in the content item database. In other embodiments, the incoming query $q_i$ may be compared only to the representative content item from each cluster.

Referring to step 916 of FIG. 9, if it is determined that all content items $q_j$ in the content item database 114 have already been compared to the incoming query $q_i$, process 900 may proceed to step 918 of determining that no content items in the content item database match the incoming query $q_i$.

It will be apparent to those skilled in the art that the exemplary processes 200, 300, 400, 500, 600, 700, 800, and 900 although described individually in the above disclosure, may be combined in a variety of ways to achieve different embodiments implementing methods of identifying an incoming e-mail as spam or of searching for a content item based on a query provided by a user. Furthermore, it will be apparent to those skilled in the art that although the above disclosure has described the various embodiments using e-mail as an exemplary form of electronic communication, the same embodiments can be applied without limitation to other forms of electronic communication, such instant messages, chat messages, text messages, SMS, pager communications, blog posts, news items, etc., as well as combinations thereof.

Embodiments of the present disclosure may be implemented fully on a server, a client, or in a system consisting of both servers and clients. Thus, for example, embodiments may be implemented in which a server may perform offline processing of all e-mails in a spam database, by accessing the e-mails from the database. In addition, upon receiving an incoming e-mail, the server may also perform online processing to determine whether an incoming e-mail is a spam e-mail by performing the exemplary processes disclosed herein.

Furthermore, embodiments may be implemented in which a client may have access to a spam database. In such embodiments, the client may perform offline processing of the e-mails stored in the spam database. Upon receiving an incoming e-mail the client may also perform online processing on the incoming e-mail according to the exemplary processes disclosed herein.

Other embodiments of the disclosure will be apparent to those skilled in the art from consideration of the specification and practice of the embodiments disclosed herein. It is intended that the specification and examples be considered as exemplary only, with a true scope and spirit of the invention being indicated by the following claims.

What is claimed is:

1. A computer-implemented method of selecting a content item from a content item database, the method comprising:
    accessing an incoming query from a memory device;
    creating a first set of tokens from the incoming query;
    computing a first total as a number of tokens in the first set of tokens;
    accessing a second set of tokens corresponding to the content item stored in the content item database;
    determining, with at least one processor, a degree of similarity by:
        determining a minimum of a first count and a second count, the first count being a count of a unique token in the first set of tokens and the second count being a count of the unique token in the second set of tokens;
        computing a randomized easy signature by:
            selecting a set of most frequent tokens from the second set of tokens;
            computing a second total as a number of tokens in the selected set of most frequent tokens;
            randomly selecting a sub-set of tokens from the selected set of most frequent tokens;
            determining a number of common tokens based on a minimum of the first count and a third count, the third count being a count of the unique token in the randomly selected sub-set of tokens; and
            determining the randomized easy signature as a ratio of the number of common tokens and a sum of the first total and the second total; and
    selecting, with the at least one processor, the content item as matching the incoming query if the degree of similarity exceeds a predetermined threshold.

2. The computer-implemented method of claim 1, wherein the incoming query comprises at least one of a search string and a user query.

3. The computer-implemented method of claim 1, wherein creating the first set of tokens comprises:
    processing the incoming query by changing an upper-case letter into a lower-case letter and removing a space; and
    creating the first set of tokens from the processed incoming query, each token having a predetermined length and overlapping a previous token by including one or more characters from the previous token.

4. The computer-implemented method of claim 1, wherein determining the degree of similarity further comprises computing an average randomized easy signature by performing the steps of:
- computing a plurality of randomized easy signatures; and
- averaging the plurality of randomized easy signatures.

5. The computer-implemented method of claim 3, wherein the incoming query comprises a title of the content item.

6. The computer-implemented method of claim 3, wherein the incoming query comprises a list of keywords corresponding to the content item.

7. The computer-implemented method of claim 3, wherein the incoming query comprises a body of the content item.

8. The computer-implemented method of claim 3, wherein the predetermined length of each token is three.

9. A computer-implemented system of selecting a content item from a content item database, the system comprising:
- a content item database which stores a plurality of content items;
- a server which performs offline processing, the offline processing comprising:
  - accessing a content item from the content item database;
  - creating a first set of tokens from the content item;
  - calculating a first total as a number of tokens in first set of tokens; and
  - storing the first set of tokens and the first total; and
- a client which performs online processing, the online processing comprising:
  - receiving an incoming query;
  - creating a second set of tokens from the incoming query;
  - calculating a second total as a number of tokens in the second set of tokens;
  - accessing the first set of tokens and the first total corresponding to one of the plurality of content items in the content item database;
  - determining a number of common tokens based on a minimum of a first count and a second count, the first count being a count of each unique token in the first set of tokens and the second count being a count of the each unique token in the second set of tokens;
  - computing a randomized easy signature by:
    - selecting a set of most frequent tokens from the second set of tokens;
    - computing a second total as a number of tokens in the selected set of most frequent tokens;
    - randomly selecting a sub-set of tokens from the selected set of most frequent tokens;
    - determining a number of common tokens based on a minimum of the first count and a third count, the third count being a count of the unique token in the randomly selected sub-set of tokens; and
    - determining the randomized easy signature as a ratio of the number of common tokens and a sum of the first total and the second total; and
  - designating the content item in the content item database as matching the incoming query when the easy signature exceeds a predetermined threshold.

10. The computer-implemented system of claim 9, wherein the incoming query comprises at least one of a search string and a user query.

11. The computer-implemented system of claim 9, wherein the content item comprises at least one of an e-mail, an instant message, a chat message, a text messages, a SMS message, a paging communication, a blog post, and a news item.

12. The computer-implemented system of claim 9, wherein creating a first set of tokens comprises:
- processing the content item by changing an upper-case letter into a lower-case letter and removing a space; and
- creating the first set of tokens from the processed content item, each token having a predetermined length and overlapping a previous token by including one or more characters from the previous token.

13. A computer program product comprising executable instructions tangibly embodied in a non-transitory computer-readable medium which, when executed by at least one processor, perform a method of selecting a content item, the method comprising:
- accessing an incoming query from a memory device;
- creating a first set of tokens from the incoming query;
- computing a first total as a number of tokens in the first set of tokens;
- accessing a second set of tokens, corresponding to the content item stored in the content item database;
- determining a degree of similarity by:
  - determining a minimum of a first count and a second count, the first count being a count of a unique token in the first set of tokens and the second count being a count of the unique token in the second set of tokens; and
  - computing a randomized easy signature by:
    - selecting a set of most frequent tokens from the second set of tokens;
    - computing a second total as a number of tokens in the selected set of most frequent tokens;
    - randomly selecting a sub-set of tokens from the selected set of most frequent tokens;
    - determining a number of common tokens based on a minimum of the first count and a third count, the third count being a count of the unique token in the randomly selected sub-set of tokens; and
    - determining the randomized easy signature as a ratio of the number of common tokens and a sum of the first total and the second total; and
- identifying the content item as matching the incoming query if the degree of similarity exceeds a predetermined threshold.

14. The computer program product of claim 13, wherein the incoming query comprises at least one of a search string and a user query.

15. The computer program product of claim 13, wherein the content item comprises at least one of an e-mail, an instant message, a chat message, a text messages, a SMS message, a paging communication, a blog post, and a news item.

16. The computer program product of claim 13, wherein the method performed by the at least one processor further comprises:
- computing an average randomized easy signature by performing the following:
  - computing a plurality of randomized easy signatures; and
  - averaging the plurality of randomized easy signatures.

* * * * *